United States Patent [19]

Horiguchi et al.

[11] Patent Number: 4,720,228
[45] Date of Patent: Jan. 19, 1988

[54] AUTOMATIC PARTS HANDLING APPARATUS

[75] Inventors: Hujio Horiguchi; Masahide Okabe; Tsutomu Shigeta, all of Tokyo, Japan

[73] Assignee: Oki Electric Industry Co., Ltd., Tokyo, Japan

[21] Appl. No.: 864,465

[22] Filed: May 19, 1986

[30] Foreign Application Priority Data

May 20, 1985 [JP] Japan .................. 60-105935

[51] Int. Cl.⁴ .............................. B65G 60/00
[52] U.S. Cl. .................. 414/32; 198/465.1; 414/37; 414/102
[58] Field of Search .......... 414/32, 37, 102, 126, 414/127; 198/465.1

[56] References Cited

U.S. PATENT DOCUMENTS

| | | | |
|---|---|---|---|
| 3,976,208 | 8/1976 | Buix et al. | 414/32 |
| 4,180,361 | 12/1979 | Longinotti | 414/32 |
| 4,541,762 | 9/1985 | Tischler | 414/32 |
| 4,588,341 | 5/1986 | Motoda | 414/32 |

FOREIGN PATENT DOCUMENTS

| | | | |
|---|---|---|---|
| 1152667 | 8/1963 | Fed. Rep. of Germany | 414/32 |
| 60-82529 | 5/1985 | Japan | 414/37 |
| 60-87125 | 5/1985 | Japan | 414/37 |

Primary Examiner—Leslie J. Paperner
Attorney, Agent, or Firm—Wenderoth, Lind & Ponack

[57] ABSTRACT

An automatic parts handling apparatus feeds a stack of accumulated pallets from a delivery apparatus to a separator apparatus that separates the lowermost pallet from the stack and conveys it to a pallet positioning apparatus whereat parts on such pallet are removed. An accumulating lifter apparatus accumulates a stack of such emptied pallets and thereafter feeds then to a storage apparatus for temporary storage thereof. The stack of pallets thus stored is fed to a discharge lifter apparatus and is elevated thereby to the deliver apparatus for further use.

3 Claims, 40 Drawing Figures

Fig. 7 (I)    Fig. 7 (II)
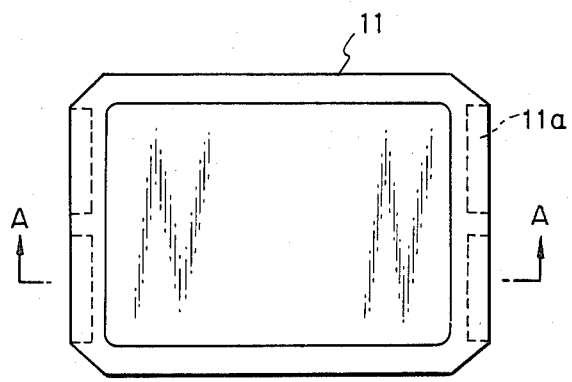 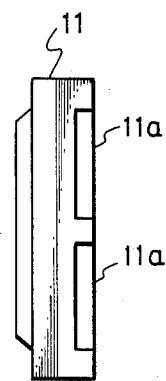
Fig. 8
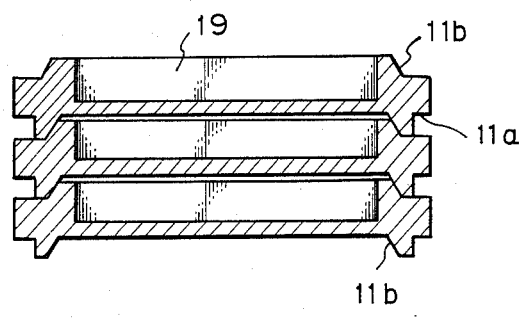

Fig. 11(III)
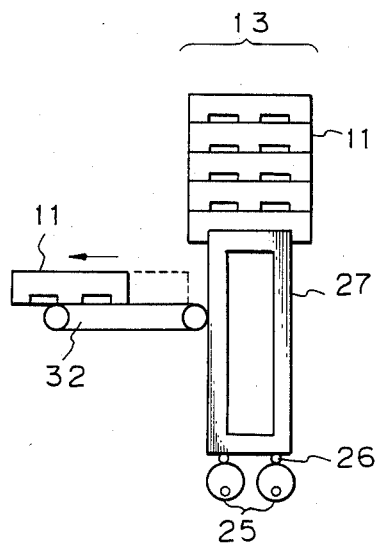

Fig. 13(III)
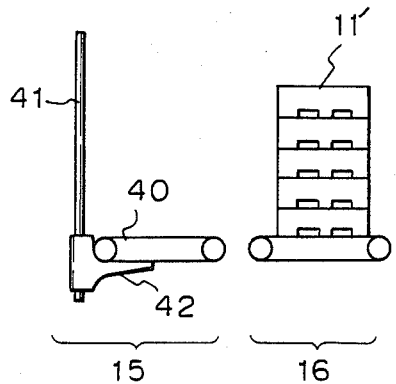

Fig. 15(III)
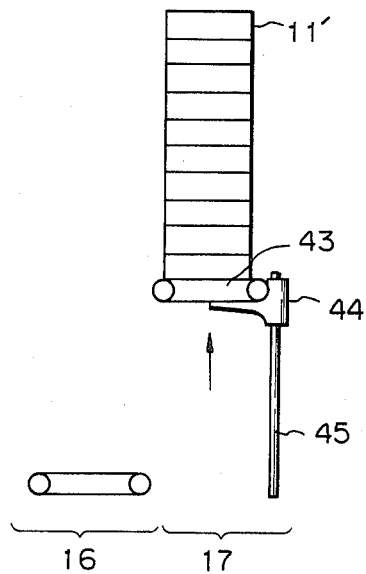

Fig. 16(III)
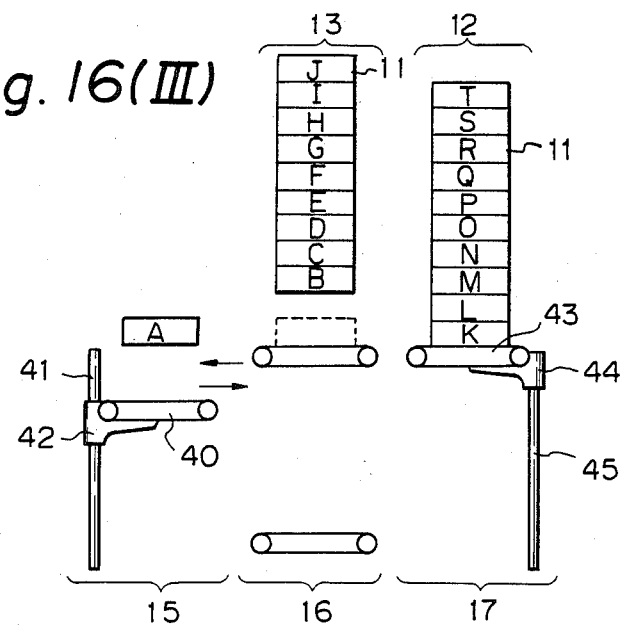

Fig. 16(VII)
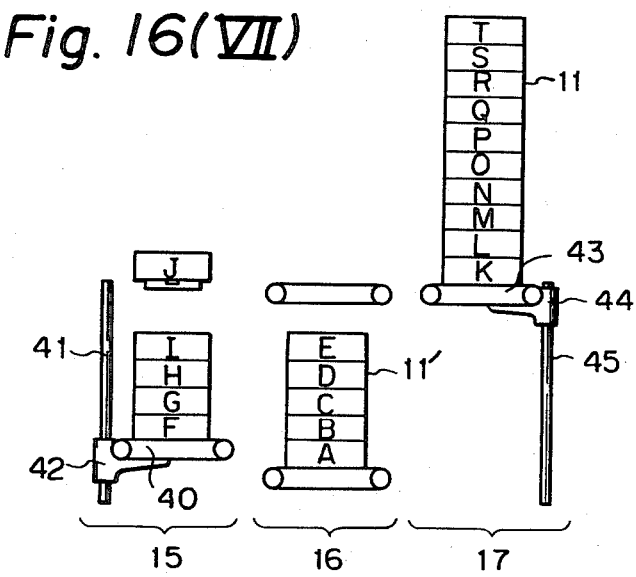
Fig. 16(VIII)
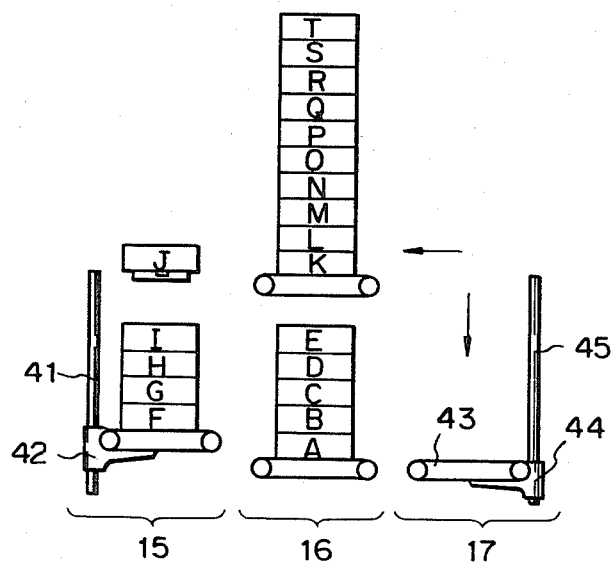

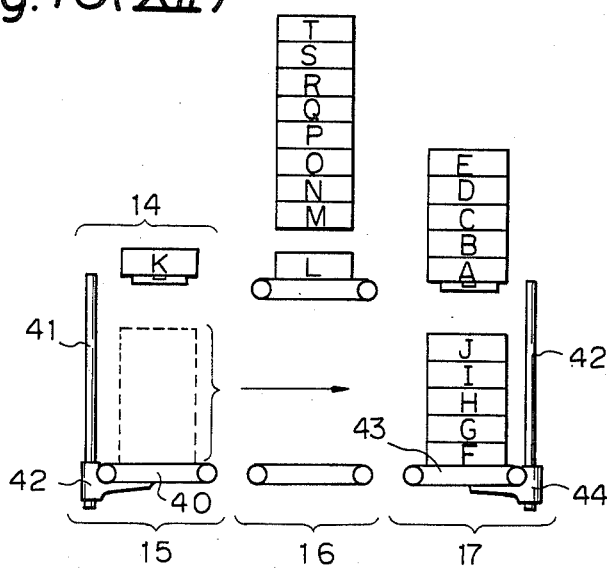
Fig.16(XII)

Fig. 16(XIII)
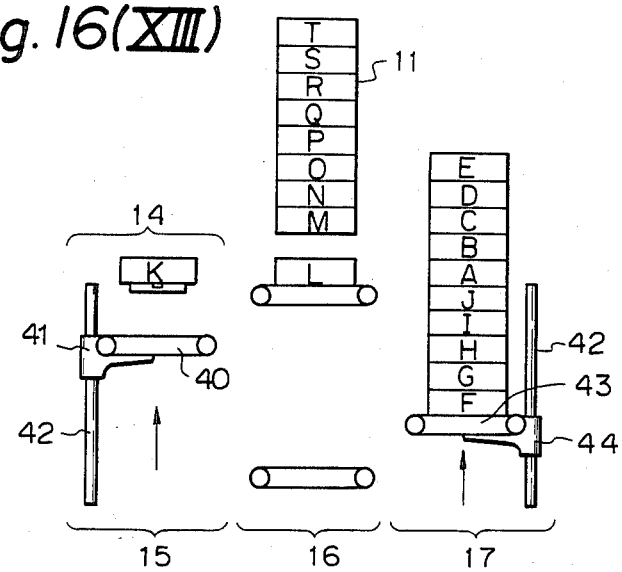
Fig. 16(XIV)
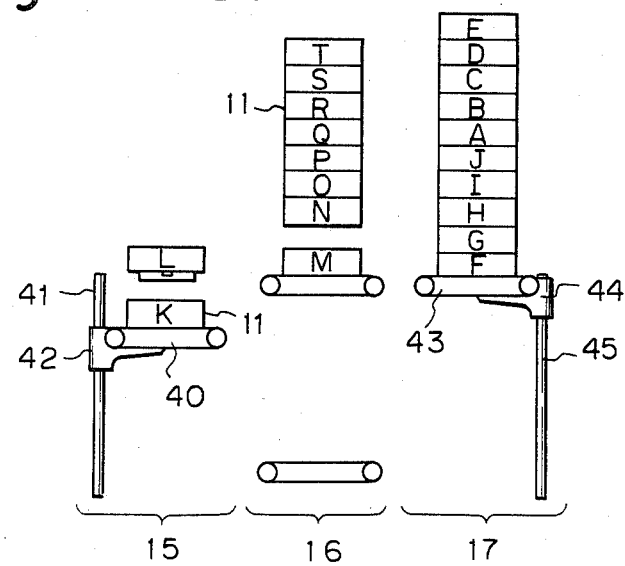

AUTOMATIC PARTS HANDLING APPARATUS

BACKGROUND OF THE INVENTION

1. Field of the Invention

The present invention relates to an automatic parts handling apparatus for successively feeding and housing a plurality of parts to and from an apparatus for successively assembling and processing the parts.

2. Description of the Prior Art

With the rapid progress of various techniques, apparatus of various types including many information processing devices have reduced life cycles while being made increasingly diversified and highly efficient. Market needs for production of such devices require elimination of uncertain manual operations, stabilized production processes by mechanization, and thus less scattered product quality, reduced production lead time, and reduced cost of manufacture. An automatic parts handling apparatus is known to promote automation to achieve such needs.

One known arrangement of an automatic parts handling apparatus will be described with reference to FIGS. 1 to 4.

Conventionally, in successively feeding a plurality parts to a parts processing apparatus, parts 2 are first lined up on a pallet 1 as shown in FIG. 1. A plurality of such pallets 1 in turn are stored or positioned on shelves 3. The pallets are taken out of order upwardly or downwardly from the shelves 3 and are fed to a processing apparatus (not shown) by means of a feeding device (not shown).

However, with such arrangement of the pallets 1 and the shelves 3 for feeding parts, it is difficult to automate the devices employed to remove the parts containing pallets from the shelves 3 as well as to position the parts containing pallets on the shelves 3. Therefore, it has been difficult to automate this type of parts feeding device.

Japanese Patent Application No. 59-148556 discloses an automatic parts handling apparatus for automating a parts feeding operation. In the following, such known automatic parts handling apparatus will be described with reference to FIGS. 3 and 4, the former figure being a side elevational view of the apparatus and the latter illustrating a sequence of operations of the apparatus. This prior apparatus includes boxes 4 housing respective pallets 5 and having hook portions 4a formed therearound. Parts 6 are positioned on pallets 5, and a plurality of such units are accumulated in a stack. The accumulated units separated from each other by means of a separator 7 with the aid of the hook portions 4a, and any one among a plurality of the separated units is removed by means of a lifter apparatus 8. The thus removed unit is moved to a prescribed position or an elevator apparatus 10 by means of a conveying apparatus 9. The elevator apparatus 10 lifts only the pallet 5 placed in the respective box 4 and feeds the parts 6 to an automatic parts processing apparatus.

When feeding of the parts 6 is completed, the empty box 4' is lowered and discharged by means of a discharge arm 1. Thereafter, the empty box 4' is returned to a prescribed recovery position with the aid of the lifter apparatus 8.

Such known automatic parts handling apparatus however is adapted to convey a plurality of parts by use of both sheet metal boxes and pallets. Accordingly, the structure of the automatic parts handling apparatus is complicated and costly because of the relatively large number of components required. Moreover, since the separator apparatus, the lifter apparatus, the conveying apparatus and the elevator apparatus are arranged side by side, the handling apparatus has a large outer size. Furthermore, empty pallets and pallets containing parts are accumulated at the same position. Accordingly, the space available to accommodate a pallet exchange operation, e.g. by means of an unmanned car, etc., is reduced, with the resultant possibility that a production line may be stopped in dependence upon the timing of parts exchange effected by the unmanned car, etc.

SUMMARY OF THE INVENTION

In view of the drawbacks of the known automatic parts handling apparatus, it is an object of the present invention to provide an automatic parts handling apparatus capable of automatically discharging parts to or from an assembling and processing apparatus.

Another object of the present invention is to provide an automatic parts handling apparatus capable of accumulating a plurality of pallets, each having a plurality of parts, and feeding such pallets as they are, thereby protecting the parts by the pallets and reducing damage and deformation of the parts.

Still another object of the present invention is to provide an automatic parts handling apparatus wherein it is not necessary to use a sheet metal box serving to house a pallet, thereby reducing the cost of manufacture.

A still further object of the present invention is to provide an automatic parts handling apparatus including a separator apparatus capable of removing the lowermost pallet of a stack of pallets including an arbitrary number of accumulated pallets, without the need for previously designating a particular number of pallets.

Still another object of the present invention is to provide an automatic parts handling apparatus capable of accumulating pallets both at the separator apparatus and at a parts delivery apparatus, whereby the pallets can be by a unmanned car, etc., with ample margin and thus with sufficient space to buffer the operation.

A still further object of the present invention is to provide an automatic parts handling apparatus adapted to remove the lowermost pallet of a stack of accumulated pallets in the separating apparatus, thereby reducing the space required to install the automatic parts handling apparatus compared with prior arrangements, and also adapted to be suitable for automation.

Still another object of the present invention is to provide an automatic parts handling apparatus including a discharge lifter apparatus, a storage apparatus and an accumulating lifter apparatus, all located below the delivery apparatus, the separator apparatus, and a pallet positioning apparatus, thereby reducing the space required to install the automatic part handling apparatus.

To achieve the above objects, an automatic parts handling apparatus according to the present invention comprises a separator apparatus for separating and conveying the lowermost pallet of a stack of accumulated pallets, each such pallet having hook portions on the sides thereof and being accumulatable, a pallet positioning apparatus for positioning the pallet so conveyed from the separator apparatus at a position of a device for feeding parts to or from such pallet, an accumulating lifter apparatus for lowering and discharging the pallets from the pallet positioning apparatus and for accumulating such lowered and discharged pallets in a stack, a storage apparatus for conveying and temporarily storing such stack of pallets, and an accumulating lifter apparatus for receiving the stack of pallets from the storage apparatus and lifting such stack to a delivery apparatus which then supports the stack for return to the separator apparatus. Thus, an automatic parts handling apparatus capable of being automated and generally requiring a reduced amount of space is provided.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7(I) is a plan view and FIG. 7(II) is a side elevational view of a pallet employed in the embodiment of FIG. 5;

FIG. 8 is a cross sectional view taken along line A-A of FIG. 7(I) and illustrating stacked such pallets;

FIG. 11(III) is a side elevational view thereof illustrating the advanced roller conveyor conveying the separated pallet;

DESCRIPTION OF THE PREFERRED EMBODIMENT

An embodiment of an automatic parts handling apparatus according to the present invention now will be described with reference to FIGS. 5 to 16.

Figure 1:
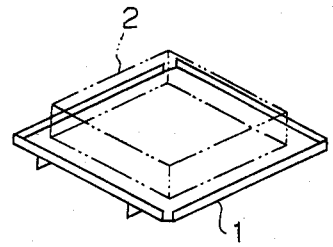
FIG. 1 is a perspective view illustrating a known pallet.
Figure 2:
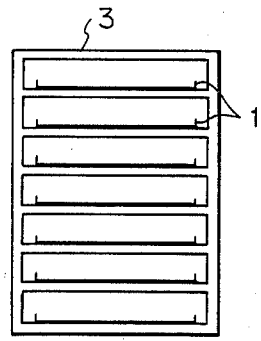
FIG. 2 is a front view of a known arrangement for accumulating a plurality of the pallets of FIG. 1.
Figure 3:
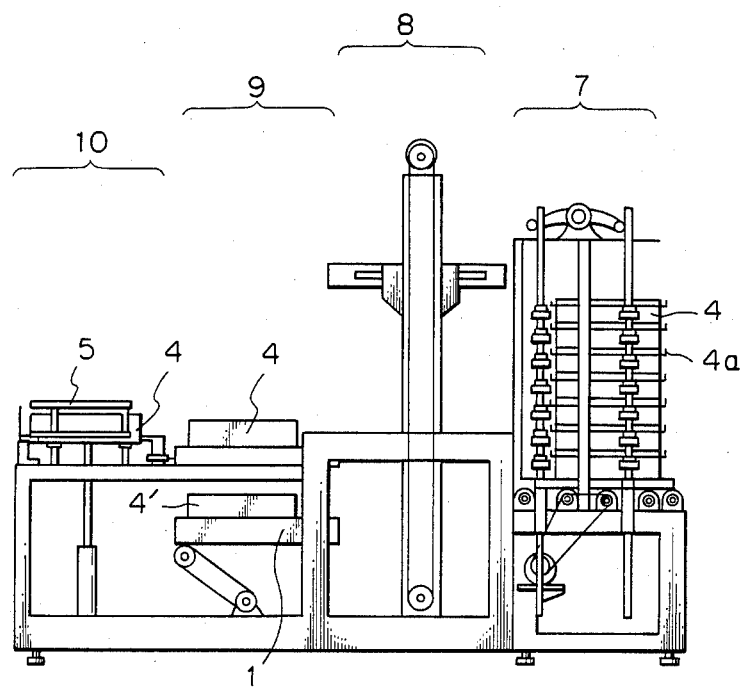
FIG. 3 is a side elevational view of a known automatic parts handling apparatus.
Figure 4:
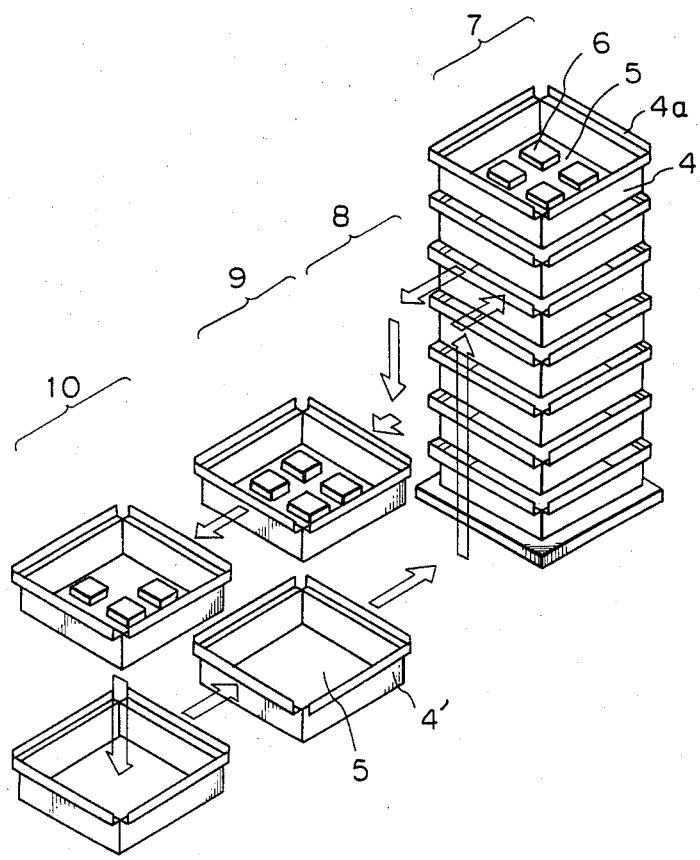
FIG. 4 is a schematic perspective view illustrating the operation of such known automatic parts handling apparatus.
Figure 5:
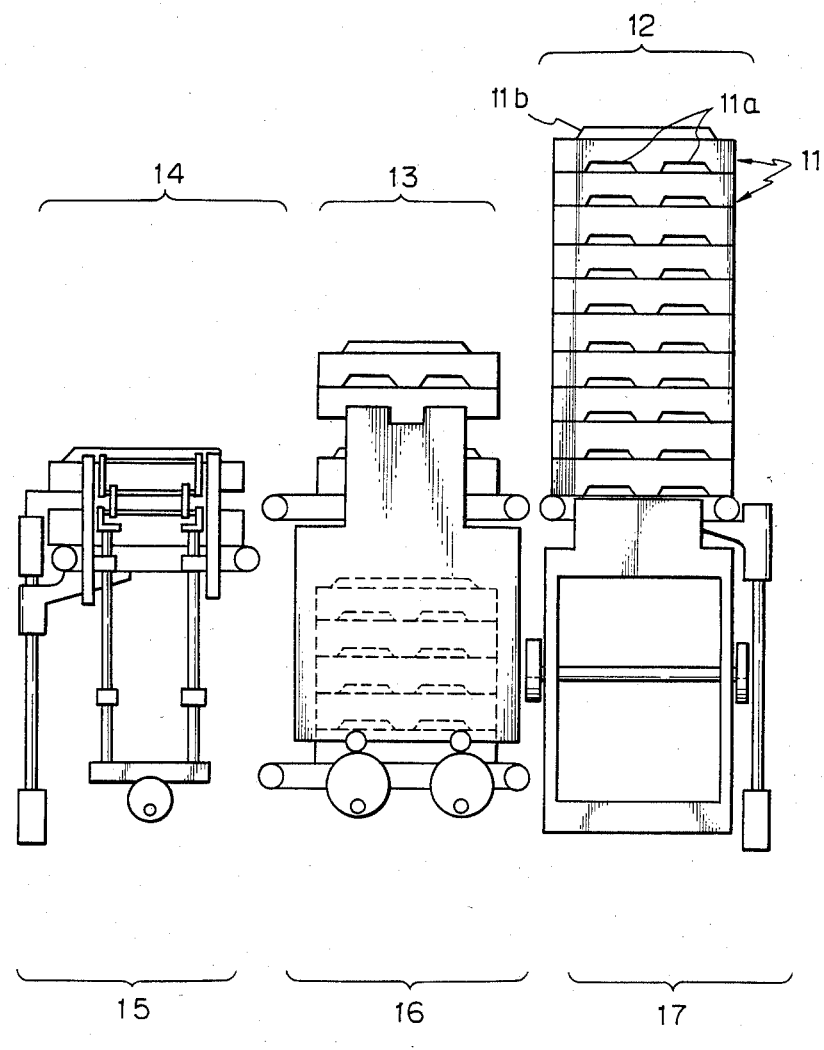
FIG. 5 is a side elevational view illustrating one embodiment of an automatic parts handling apparatus according to the present invention.
Figure 6:
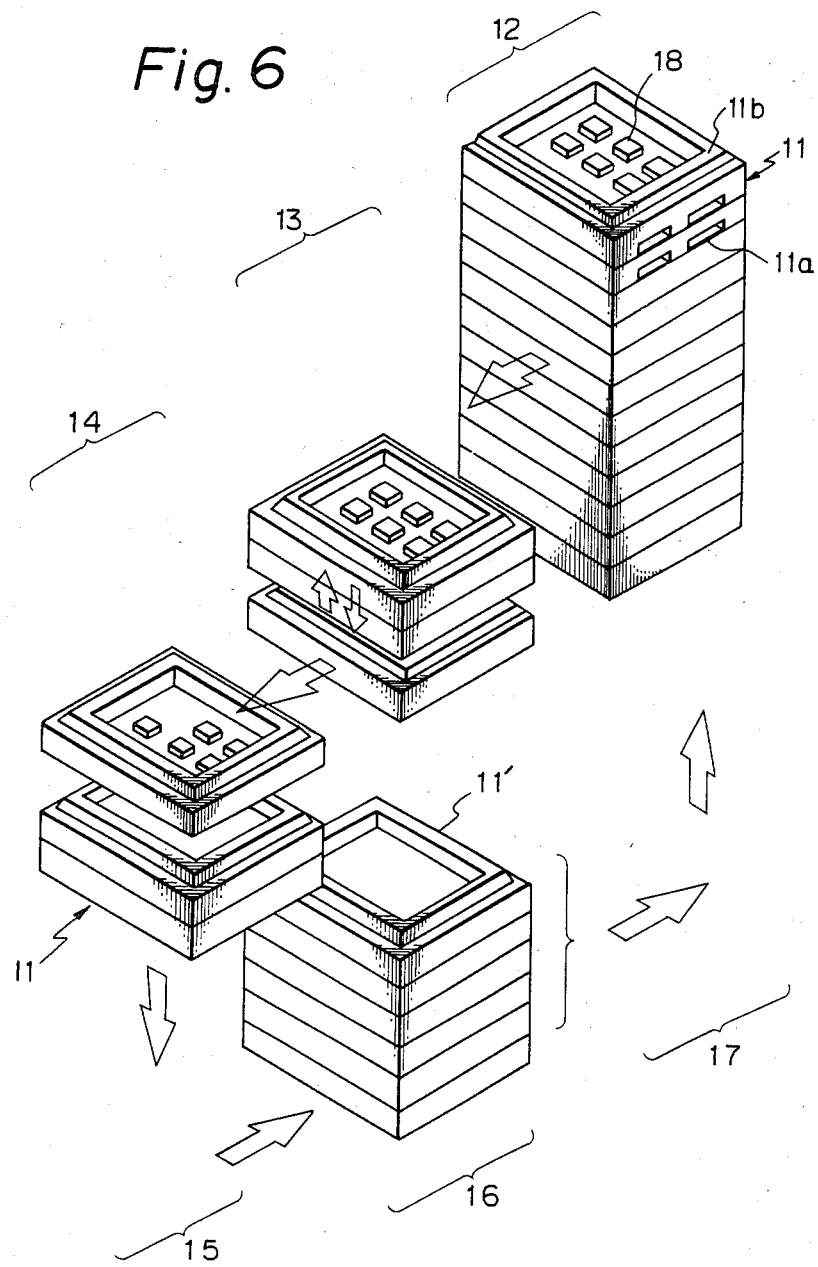
FIG. 6 is a schematic perspective view illustrating the operation of the apparatus of FIG. 5.

FIGS. 5 and 6 illustrate the general operation of the apparatus as well as the directions of movements of parts containing pallets 11 and empty pallets 11' therein. Each pallet 11, 11' is a plastic pallet having recesses forming two downwardly facing grooved hook portions 11a on two opposite sides thereof and houses therein parts 18 in a predetermined alignment. The pallet 11 furthermore includes upwardly and downwardly extending guide surfaces 11b formed to facilitate accumulation or stacking thereof. As the pallets 11 are accumulated or stacked, the guide surfaces 11b engage with each other, as shown in FIG. 8.

A pallet delivery apparatus 12 delivers pallets 11 accumulated by suitable means, e.g. an unmanned car, etc., and a separator apparatus 13 separates the lowest pallet of the stack from the remaining accumulated pallets of the stack, which lowest pallet is received and positioned by a pallet positioning apparatus 14 for permitting the parts housed therein to be fed therefrom to an automatic assembling and processing apparatus. An accumulating lifter apparatus 15 lowers and discharges empty pallets 11' which have had the parts fed therefrom. The empty pallets 11' accumulated in a stack by lifter apparatus 15 are temporarily stored in a stock or storage apparatus 16 and then are received and fed by a discharge lifter apparatus 17 from the stock apparatus 16 to the parts delivery apparatus 12.

The empty stacked pallets 11' are returned by the discharge lifter apparatus 17 to an original position of accumulation. Thus, the space required to handle the plurality of parts can be reduced by conveying the pallets in a three-dimensional manner, i.e. with an in-line arrangement of apparatus 12, 13, 14 located above an in-line arrangement of apparatus 15, 16, 17.

The structure of pallet 11 and the accumulation of plural pallets 11 will be described with reference to FIGS. 7(I), 7(II), and FIG. 8.

Referring to FIGS. 7(I) and 7(II), respectively showing a plan view and a side elevational view of pallet 11, and to FIG. 8, showing a side cross sectional view of plural accumulated plates 11, the hook portions 11a of the pallet 11 serve as hooking grooves in the separator apparatus 13 in the pallet positioning apparatus 14. In addition, the guide surfaces 11b enable the pallets to be stacked in the delivery apparatus 12.

Figure 9I:
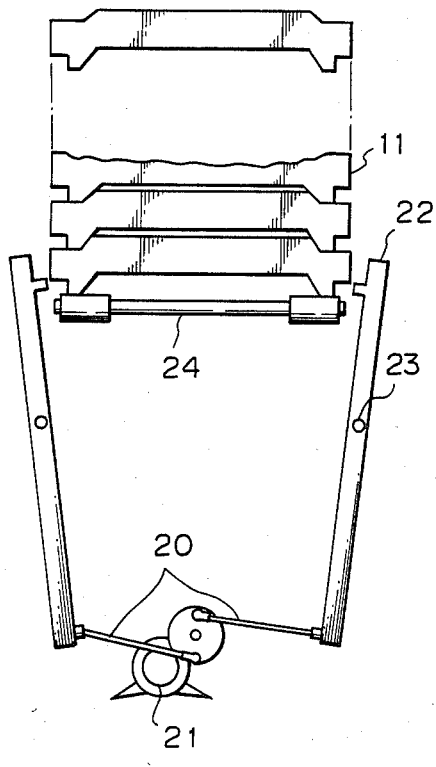
FIG. 9(I) and 9(II) are front views illustrating a pallet centering mechanism of a pallet delivery apparatus shown respectively in open non-centering and closed centering positions.
Figure 9:
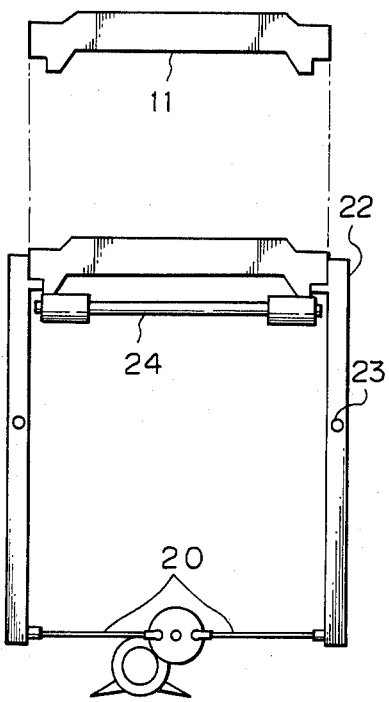

The arrangement and operation of the delivery apparatus 12 will be described with reference to FIGS. 9(I) and 9(II). Levers 22 are pivoted around supporting points 23 by links 20 by a motor 21. First, as shown in FIG. 9(I), the pallets 11 are fed by means of an unmanned car, etc., in the stacked state between spread apart upper ends of levers 22. Motor 21 then is driven to pivot levers 22 to center the stack of pallets 11, as shown in FIG. 9(II) and thereafter the levers 22 are returned to the state of FIG. 9(I). As shown in FIG. 9(II), the stack of pallets 11 so centered in position is conveyed to the separator apparatus 13 by a conveyor 24 of the discharge lifter apparatus 17.

Figure 10:
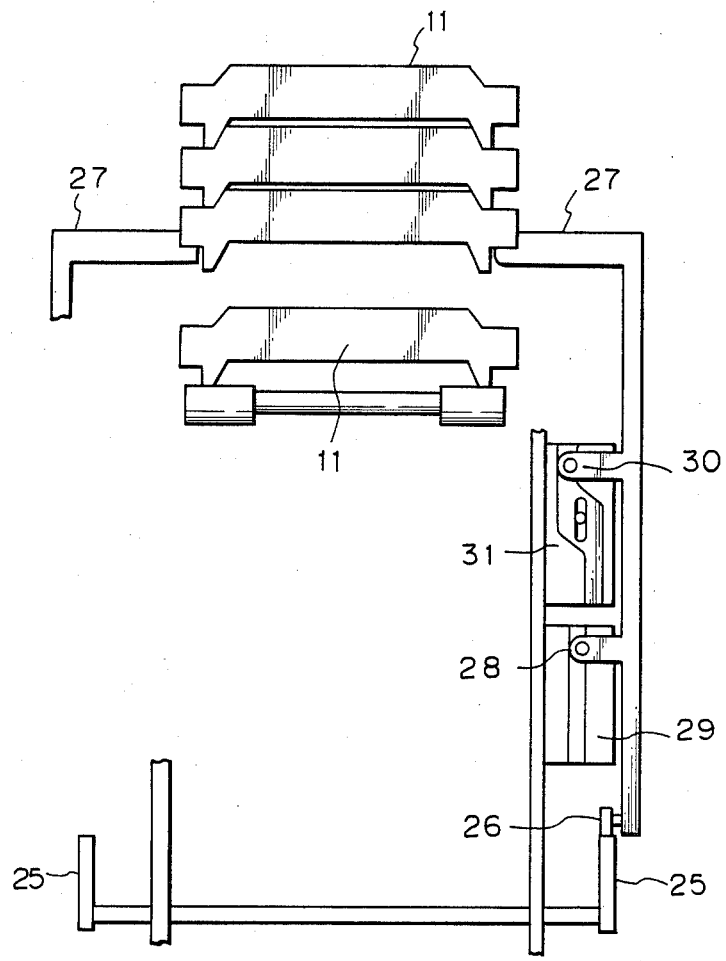
FIG. 10 is a front view illustrating separation of pallets from each other in a pallet separator apparatus.

FIG. 10 illustrates the separation from the lowermost pallet 11 of the other pallets 11 of the stack by the separator apparatus 13. Eccentric cams 25 are rotated by driving a motor (not shown) and thereby levers 27 are lifted via cam followers 26. A supporting cam follower 28 is provided on each lever 27, while a separating cam follower 30 pivots around each cam follower 28 while following a groove in a cam 31. The levers 27, by the combination of these operations, lifts the pallets 11 above the lowermost pallet 11 while leaving behind and thereby separating the lowermost pallet 11.

Figure 11I:
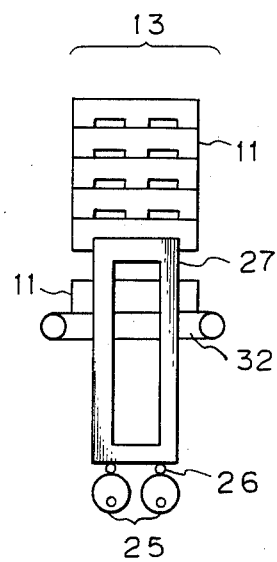
FIG. 11(I) is a side elevational view of the apparatus of FIG. 10 showing the pallets separated.
Figure 11:
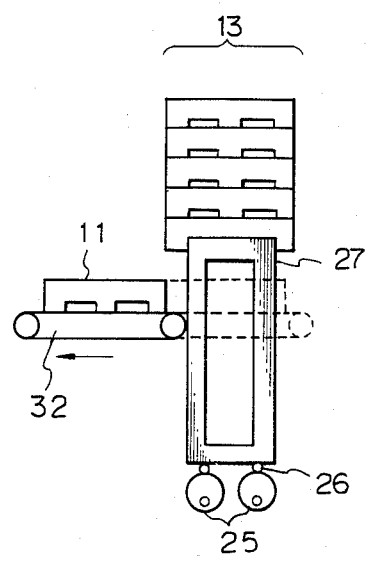
FIG. 11(II) is a side elevational view thereof illustrating a roller conveyor being advanced with a separated pallet.

The operation of conveying the lowermost pallet 11 separated as described above to the pallet positioning apparatus 14 now will be described with reference to FIG. 11(I), 11(II) and 11(III), respectively illustrating a state of the lowermost pallet separated from the remaining pallets 11, a state of a roller conveyor 32 supporting separated pallet 11 being advanced, and a state of such pallet 11 being conveyed by the roller conveyor 32. Namely, the roller conveyor 32 is caused to advance by a driving device (not shown) from the position shown in FIG. 11(I) to the position shown in FIG. 11(II), and is rotated at the end of such advancement as shown in FIG. 11(III) for conveying the separated lowermost pallet 11 to the pallet positioning apparatus.

The pallet 11 is conveyed in the above manner by advancing and rotating the roller conveyor 32 of the separating apparatus part 13. Thereby the accumulating lifter apparatus 15 (described below) can perform not only the function of simply discharging a blank pallet, but also a buffering function by accumulating empty pallets 11'.

The operation of the pallet positioning apparatus 14 to position the pallet 11 conveyed as described above now will be described with reference to FIGS. 12(I) and 12(II). Eccentric cams 33 are rotated by a drive source (not shown) and thereby arms 36 start to be lifted via cam followers 34 to permit press plates 37 to effect a circular-arc movement for supporting the pallet 11 therebetween as shown in FIG. 12(II). Thereupon, cam followers 38 provided on the press plates 37 move in cam grooves 39 to cause plates 37 to be located at positions parallel to the pallet.

After positioning the pallet 11 in such a manner, the parts 18 are picked up by means of a robot hand, etc., and fed to the assembling and processing apparatus.

The operation of the accumulating lifter apparatus 15 after the completion of the feeding of the parts 18, now will be described with reference to FIGS. 13(I), 13(II), 13(III) and 13(IV).

Figure 12I:
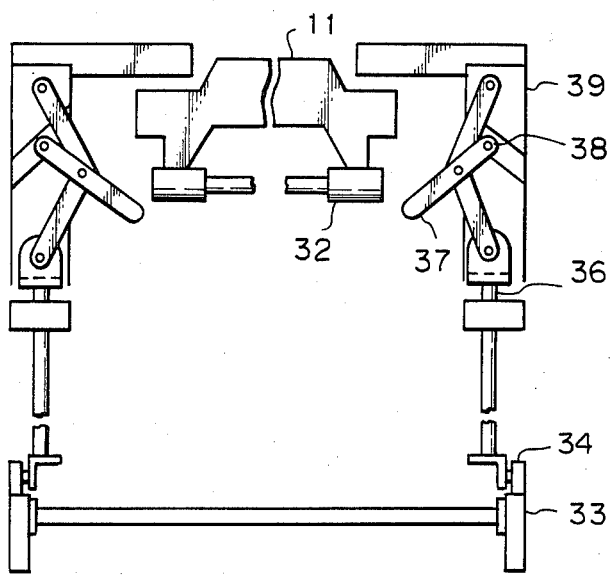
FIG. 12(I) is a front view illustrating a pallet positioning apparatus in an open position.
Figure 12:
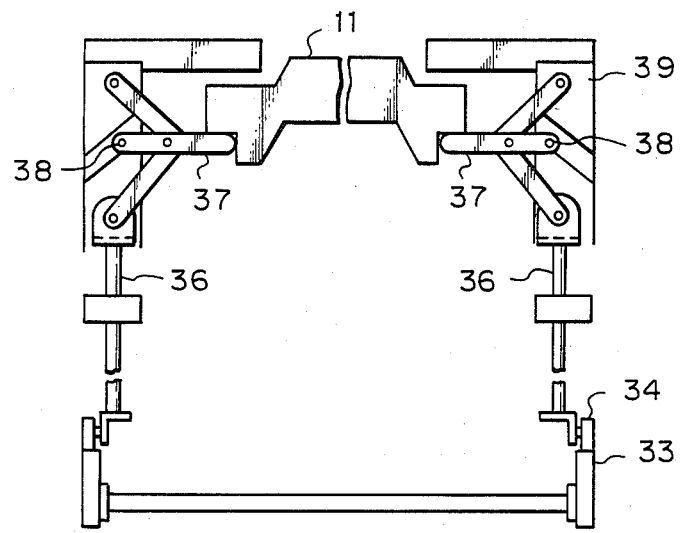
FIG. 12(II) is a front view thereof in a closed position after positioning the pallet.
Figure 13I:
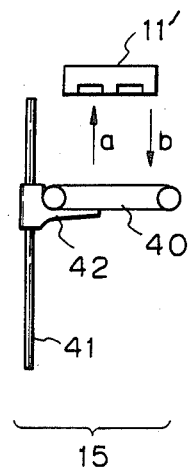
FIGS. 13(I) to 13(IV) are side elevational views illustrating the operation process of an accumulating lifter apparatus for accumulating empty pallets.
Figure 13:
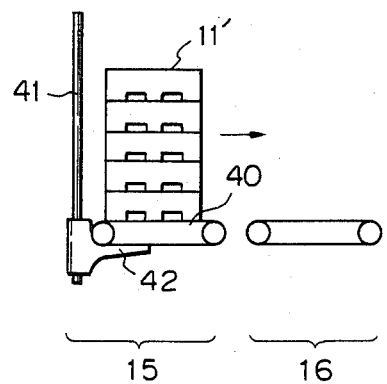
Figure 13:
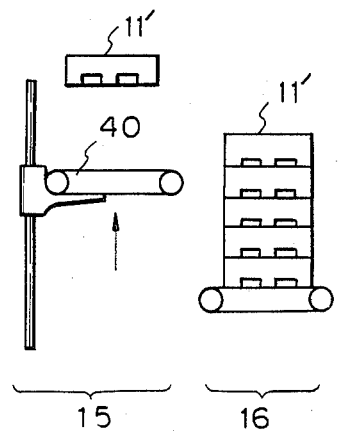

As shown in FIG. 13(I), an accumulating lifter 42 having a belt conveyor 40 provided thereon is lifted to the lower surface of the thus emptied or processed pallet 11' by means of a drive device (not shown) while being guided during such movement by a guide shaft 41 ((a) of FIG. 13(I)), and receives such empty pallet 11', with apparatus 14 in the open position shown in FIG. 12(I). Lifter 42 then is lowered to a prescribed position ((B) of FIG. 13(I)). When, with the operation described above being repeated, a predetermined number of processed pallets 11' is accumulated on lifter 42, as shown in FIG. 13(II), the belt conveyor 40 is rotated to convey the stack of accumulated pallets 11' to the storage apparatus 16 as shown in FIG. 13(III). The above operation then is repeated by the accumulating lifter apparatus 15.

Figure 14I:
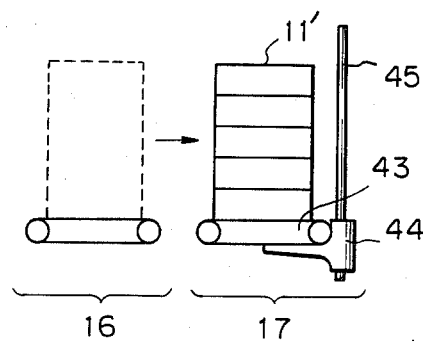
FIGS. 14(I) to 14(II) are side elevational views illustrating the operation of a discharge lifter apparatus.

The operation of transfer of the stack of blank pallets 11' from the storage apparatus 16 by means of the discharge lifter part 17 will be described with reference to FIGS. 14(I) and 14(II), respectively illustrating a state of the stack of blank pallets 11' transferred onto a belt conveyor 43 and a state of feeding such stack of pallets 11' into the delivery apparatus 12. The discharge lifter apparatus 17 first receives the stack of blank pallet 11' conveyed from the storage apparatus 16 as shown in FIG. 14(I). Then a lifter 44 is lifted toward the delivery apparatus 12 by means of a drive device (not shown) while being guided during such movement by a guide shaft 45.

The operation of transfer of the stack of blank pallets 11' from the discharge lifter apparatus 17 now will be described with reference to FIGS. 15(I), 15(II), 15(III) and 15(IV).

Figure 14:
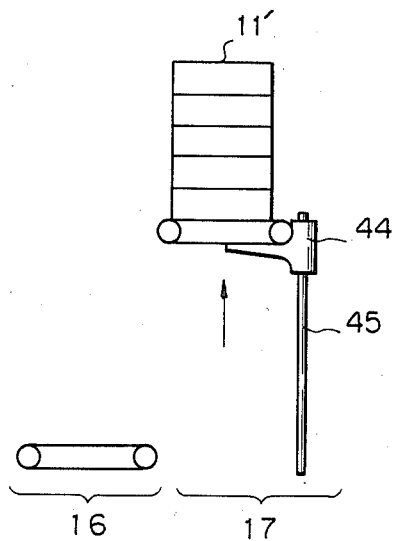
Figure 15I:
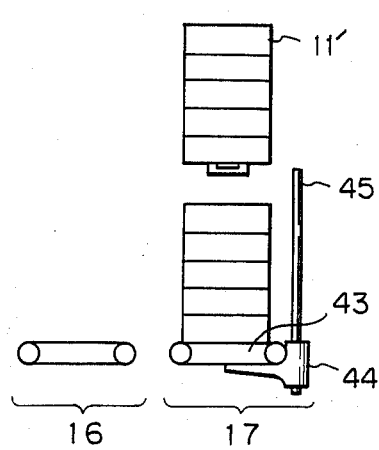
FIGS. 15(I) to 15(III) are side elevational views further illustrating an operation process of the discharge lifter apparatus.
Figure 15:
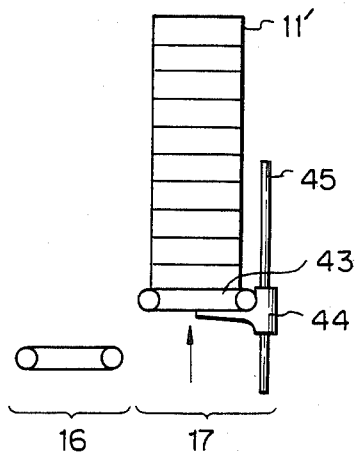

First, after lifting the lifter 44, as shown in FIG. 14(II), the thus lifted stack of blank pallets 11' is supported by the centering mechanism of the delivery apparatus 12 as described above with reference to FIGS. 9(I), 9(II) and as shown in FIG. 15(I). Conveyor 43 of lifter 44 in turn receives the next stack of blank pallets 11' from the storage apparatus 16. The lifter 44 again is lifted as shown in FIG. 15(II) to a prescribed location for releasing the centering mechanism of delivery apparatus 12 and is lifted further as shown in FIG. 15(III) to a position for the double stack of pallets 11' to be supported by the apparatus 12.

The complete flow of the pallets 11 and 11' now will be described with reference to FIGS. 16(I) to 16(XIV).

Figure 16I:
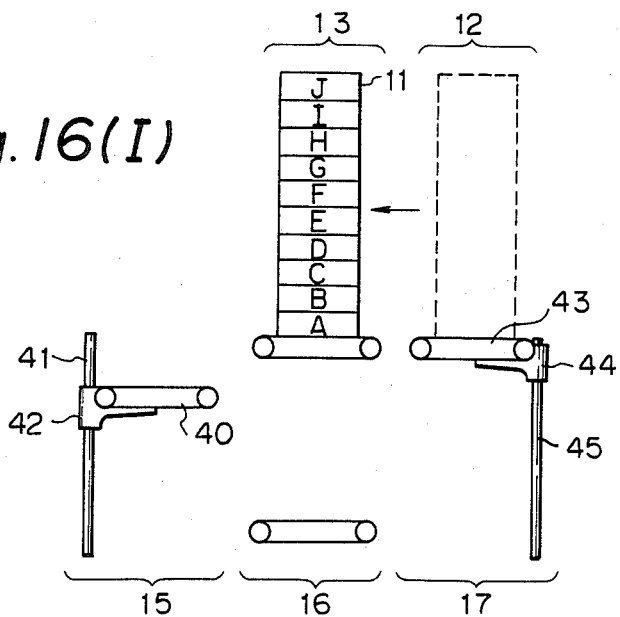
FIGS. 16(I) to 16(XIV) are side elevational views illustrating the movements of a plurality of pallets through the automatic parts handling apparatus of the invention.

(1) A stack of pallets 11 present at the delivery apparatus 12 is fed to the separator apparatus 13 (FIG. 16(I)).

Figure 16:
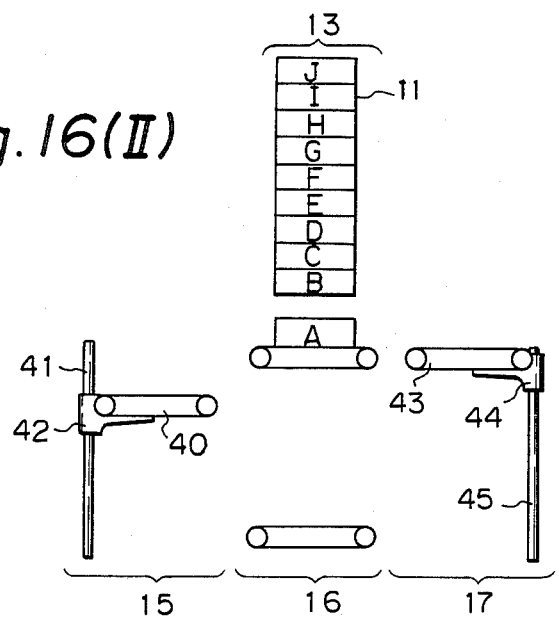
Figure 16:
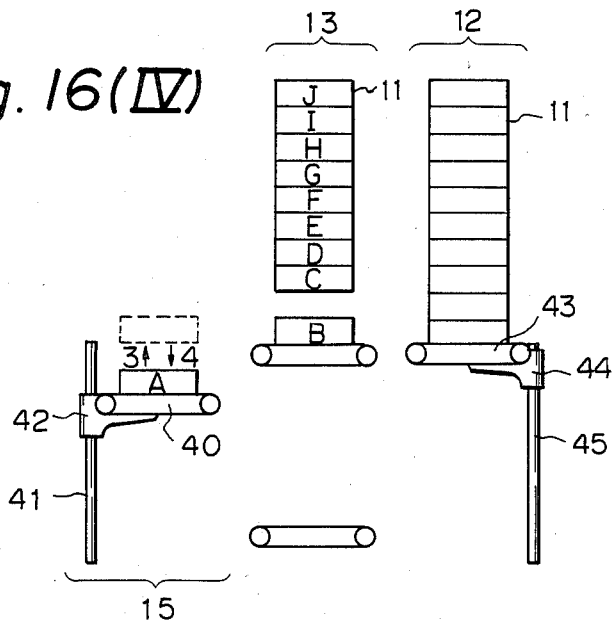

(2) The lowermost pallet A of such stack is separated from the remaining pallets 11 of the stack by the separator apparatus 13 (FIG. 16(II)).

(3) The pallet A thus separated is fed to the pallet positioning apparatus 14, whereat the parts are removed therefrom (FIG. 16(III)).

(4) Such blank pallet A, having the parts removed therefrom is discharged to the accumulating lifter apparatus 15, while a new double stack of pallets 11 is fed to the delivery apparatus 12 (FIG. 16(IV)).

Figure 16V:
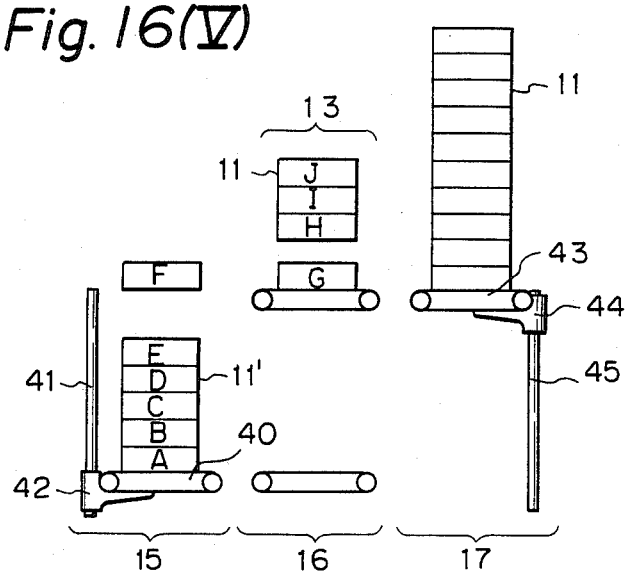
Figure 16:
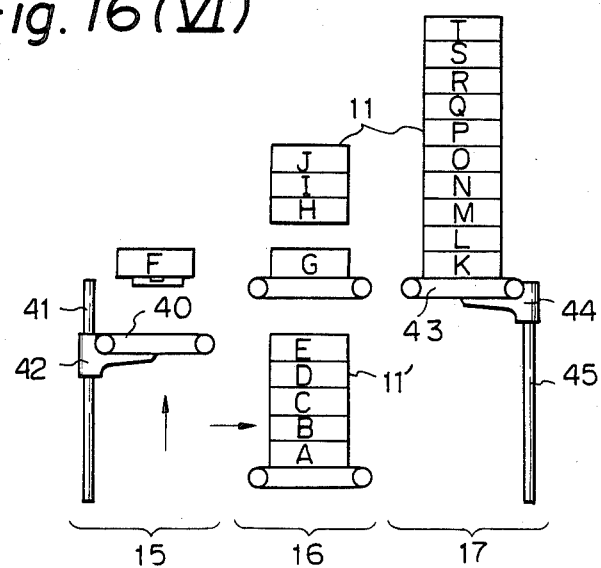
Figure 16:
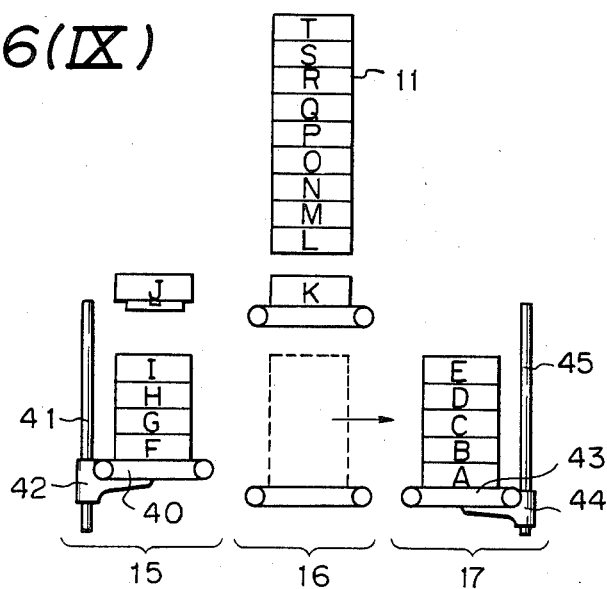

(5) The empty or blank pallets 11' (i.e. pallets A-E) are accumulated in the accumulating lifter apparatus 15 by repeating the above operation 4) of discharging the blank pallets 11' (FIG. 16(V)).

(6) The stack of blank pallets 11' thus accumulated is fed to the storage apparatus 16 (FIG. 16(VI)).

(7) The remaining pallets F-J discharged and accumulated on the accumulating lifter apparatus 15 via the pallet positioning apparatus 14, in the manner described above, until no pallets 11 remain in the separator apparatus (FIG. 16(VII)).

(8) After the new double stack of pallets 11 is fed from the delivery apparatus 12 to the separator apparatus 13, lifter 44 of the discharge lifter apparatus 17 is lowered (FIG. 16(VIII)).

(9) The stack of blank pallets 11' in the storage apparatus 16 is conveyed to the discharge lifter apparatus 17 (FIG. 16(IX)).

Figure 16X:
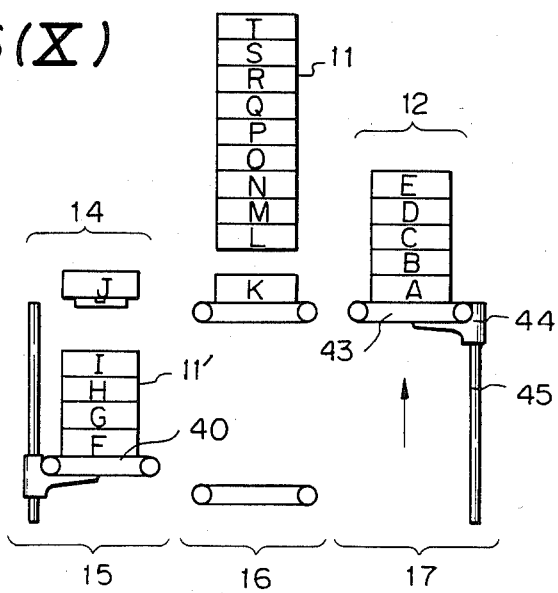
Figure 16:
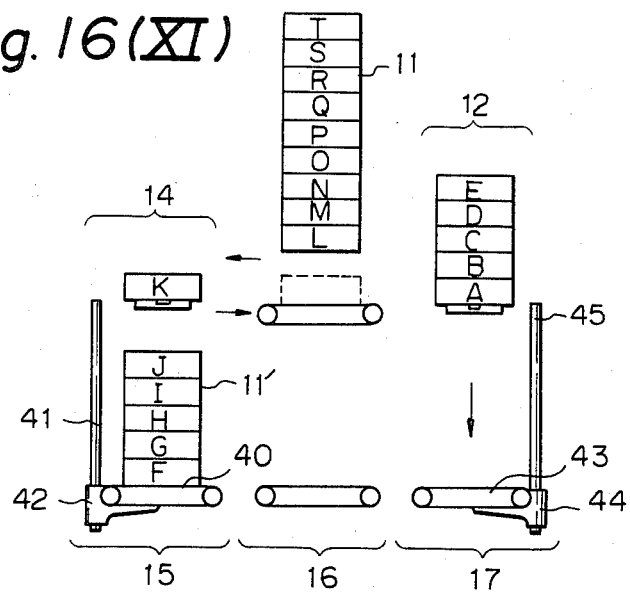

(10) Such stack of blank pallets is elevated by lifter 44 and is held by means of the centering apparatus of the delivery apparatus (FIG. 16(X)).

(11) The lifter 44 is again lowered (FIG. 16(XI)).

(12) The stack of pallets 11' accumulated on the accumulating lifter apparatus 15 is fed to the discharge lifter apparatus 17 through the storage apparatus 16 (FIG. 16(XII)).

(13) The lifter 44 of the discharge lifter apparatus 17 again is raised toward a prescribed position, while the accumulating lifter 42 of the accumulating lifter apparatus 15 is elevated (FIG. 16(XIII)).

(14) The lifter 44 is further elevated, thereby returning the original pallets, in revised order, to the prescribed recovery position (FIG. 16(XIV)).

With the operation described above being repeated, many parts 18 housed in the pallets 11 can be automatically fed to the automatic assembling and processing apparatus.

Furthermore, although in the present embodiment an automatic feed mechanism is described, the automatic parts handling apparatus according to the present invention can of course include an automatic feed function capable of permitting the arrangement described above to receive the parts assembled and processed by the automatic assembling and processing apparatus.

Although a preferred embodiment has been shown and described, it should be understood that many changes and modifications may be made thereto without departing from the scope of the invention.

We claim:

1. An automatic parts handling apparatus for feeding parts to and receiving parts from an apparatus for successively assembling and processing the parts, said automatic parts handling apparatus comprising:

a plurality of pallets, each said pallet having an area for supporting parts, and said pallets being capable of being stacked;

a delivery apparatus for receiving and delivering a stack of said pallets.

a separator apparatus for receiving said stack of pallets from said delivery apparatus, said separator apparatus including means for sequentially separating one at a time from said stack of pallets the lowermost said pallet and sequentially conveying the thus separated pallets;

a positioning apparatus for sequentially receiving one at a time said separated pallets from said separator apparatus and for positioning said thus received pallet at a location whereat parts are fed thereto or removed therefrom;

an accumulating lifter apparatus for removing from said positioning apparatus one at a time the thus processed pallets having parts fed thereto or removed therefrom and for accumulating in a stack an arbitrary number of said processed pallets;

a storage apparatus for receiving from said accumulating lifter apparatus and temporarily storing said stack of processed pallets;

a discharge lifter apparatus for receiving said stack of processed pallets from said storage apparatus and for returning said stack of processed pallets to said delivery apparatus; and said delivery apparatus, said separator apparatus and said positioning apparatus being positioned in-line at a location above an in-line arrangement of said accumulating lifter apparatus, said storage apparatus, and said discharge lifter apparatus, such that said pallets are transferred downwardly from said positioning apparatus to said accumulating lifter apparatus and are transferred upwardly from said discharge lifter apparatus to said delivery apparatus.

2. An apparatus as claimed in claim 1, wherein each said pallet has on opposite sides thereof grooves forming means for engagement of structure to support said pallet.

3. An apparatus as claimed in claim 1, wherein each said pallet has upper and lower guide surfaces facilitating stacking of plural said pallets.

* * * * *